US009484994B2

(12) United States Patent
Xiao et al.

(10) Patent No.: US 9,484,994 B2
(45) Date of Patent: Nov. 1, 2016

(54) ADAPTIVE MODE-SWITCHING SPATIAL MODULATION FOR MIMO WIRELESS COMMUNICATION SYSTEM

(75) Inventors: Yue Xiao, Chengdu (CN); Jun Fang, Xi'an (CN); Ping Yang, Chengdu (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/408,563

(22) PCT Filed: Jun. 18, 2012

(86) PCT No.: PCT/CN2012/077104
§ 371 (c)(1),
(2), (4) Date: Dec. 16, 2014

(87) PCT Pub. No.: WO2013/189016
PCT Pub. Date: Dec. 27, 2013

(65) Prior Publication Data
US 2015/0195018 A1    Jul. 9, 2015

(51) Int. Cl.
*H04B 7/02* (2006.01)
*H04B 7/04* (2006.01)
(Continued)

(52) U.S. Cl.
CPC ............ *H04B 7/0456* (2013.01); *H04B 7/063* (2013.01); *H04B 7/0691* (2013.01); *H04B 7/0822* (2013.01); *H04B 7/0874* (2013.01); *H04L 1/0003* (2013.01); *H04L 27/0008* (2013.01)

(58) Field of Classification Search
CPC .................................................... H04B 7/0452
USPC .......................................................... 375/267
See application file for complete search history.

(56) References Cited

U.S. PATENT DOCUMENTS 6,748,021 B1 *  6/2004  Daly ............................ 375/261
7,593,486 B2    9/2009  Jeong et al.
(Continued)

FOREIGN PATENT DOCUMENTS

CN           1815918 A       8/2006

OTHER PUBLICATIONS

Yang-Seok Choi et al., "A Pragmatic PHY Abstraction Technique for Link Adaptation and MIMO Switching", IEEE Journal on Selected Areas in Communications, Aug. 2008, pp. 960-971, vol. 26, No. 6.
(Continued)

*Primary Examiner* — Santiago Garcia
(74) *Attorney, Agent, or Firm* — Ren-Sheng International

(57) ABSTRACT

Techniques are generally described related to tag refinement strategy. One example method for communicating between a first wireless system having a plurality of first antennas and a second wireless system having a plurality of second antennas may be presented. The method may include receiving configuration information associated with the plurality of first antennas and a plurality of modulation schemes which the first wireless system is configured to support; determining a plurality of configurations based on the configuration information, wherein each of the plurality of configurations defines a corresponding subset of first antennas selected from the plurality of first antennas and a corresponding modulation scheme selected from the plurality of modulation schemes; and selecting a first configuration from the plurality of configurations, wherein when operating under the first configuration, the first wireless system is configured to achieve one or more performance criteria.

19 Claims, 6 Drawing Sheets

(51) Int. Cl.
　　　*H04B 7/06*　　(2006.01)
　　　*H04B 7/08*　　(2006.01)
　　　*H04L 1/00*　　(2006.01)
　　　*H04L 27/00*　(2006.01)

(56) References Cited

U.S. PATENT DOCUMENTS

| | | | |
|---|---|---|---|
| 7,894,382 B2 | 2/2011 | Choi et al. | |
| 7,936,843 B2 | 5/2011 | Zhou et al. | |
| 8,081,697 B2* | 12/2011 | Choi et al. | 375/267 |
| 8,553,818 B2* | 10/2013 | Chun et al. | 375/347 |
| 2002/0102950 A1* | 8/2002 | Gore et al. | 455/101 |
| 2004/0132496 A1 | 7/2004 | Kim et al. | |
| 2005/0088959 A1* | 4/2005 | Kadous | 370/208 |
| 2005/0157807 A1 | 7/2005 | Shim et al. | |
| 2006/0176993 A1 | 8/2006 | Kwun et al. | |
| 2007/0201350 A1* | 8/2007 | Papasakellariou | 370/208 |
| 2007/0263569 A1 | 11/2007 | Choi et al. | |
| 2008/0075022 A1* | 3/2008 | Lei et al. | 370/310 |
| 2008/0080641 A1* | 4/2008 | Kim | 375/299 |
| 2008/0159203 A1 | 7/2008 | Choi et al. | |
| 2009/0021434 A1* | 1/2009 | Lee et al. | 343/703 |
| 2009/0034637 A1* | 2/2009 | Hoshino et al. | 375/260 |
| 2010/0222008 A1* | 9/2010 | Astely et al. | 455/67.11 |
| 2010/0227620 A1* | 9/2010 | Naden et al. | 455/445 |
| 2010/0248656 A1 | 9/2010 | Zhou | |
| 2011/0051821 A1* | 3/2011 | Gresset et al. | 375/259 |

OTHER PUBLICATIONS

Antonio Forenza et al., "A Low Complexity Algorithm to Simulate the Spatial Covariance Matrix for Clustered MIMO Channel Models", IEEE 59th Vehicular Technology Conference, May 17-19, 2004, pp. 889-893, vol. 2.

Robert W. Heath, Jr et al., "Switching Between Diversity and Multiplexing in MIMO Systems", IEEE Transactions on Communications, Jun. 2005, pp. 962-968, vol. 53, No. 6.

International Search Report and Written Opinion of the International Searching Authority, International application No. PCT/CN2012/077104, Feb. 28, 2013.

Sergey L. Loyka, "Channel Capacity of MIMO Architecture Using the Exponential Correlation Matrix", IEEE Communications Letters, Sep. 2001, pp. 369-371, vol. 5, No. 9.

Raed Y. Mesleh et al., "Spatial Modulation", IEEE Transactions on Vehicular Technology, Jul. 2008, pp. 2228-2241, vol. 57, No. 4.

Jan Mietzner et al., "Multiple-Antenna Techniques for Wireless Communications—A Comprehensive Literature Survey", IEEE Communications Surveys & Tutorials, Second Quarter 2009, pp. 87-105, vol. 11, No. 2.

Vahid Tarokh et al., "Space-Time Block Codes from Orthogonal Designs", IEEE Transactions on Information Theory, Jul. 1999, pp. 1456-1467, vol. 45, No. 5.

P. W. Wolniansky et al., "V-Blast: An Architecture for Realizing Very High Data Rates Over the Rich-Scattering Wireless Channel", URSI International Symposium on Signals, Systems, and Electronics, IEEE Explore, 1998, pp. 295-300.

Ping Yang et al., "Initial Performance Evaluation of Spatial Modulation OFDM in LTE-based Systems", 6th International ICST Conference on Communications and Networking in China (CHINACOM), 2011, pp. 102-107.

Ping Yang et al., "Adaptive Spatial Modulation for Wireless MIMO Transmission Systems", IEEE Communications Letters, Jun. 2011, pp. 602-604, vol. 15, No. 6.

"Supplementary European Search Report", Application No. 12879423.7 of International application No. PCT/CN2012/077104, Dec. 18, 2015.

\* cited by examiner

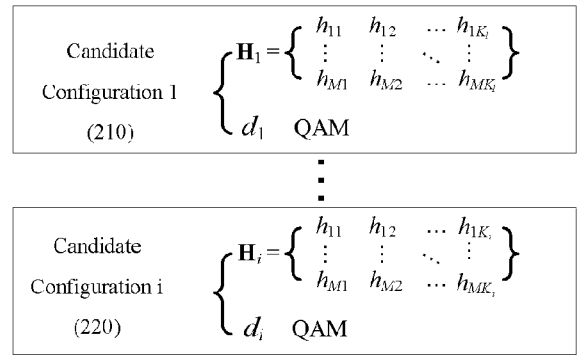
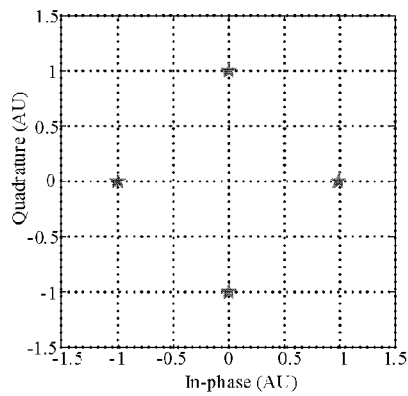
Constellation for 4-PSK
(230)
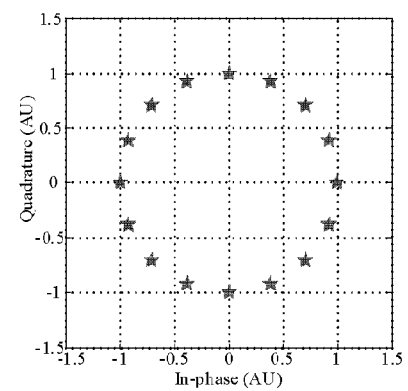
Constellation for 16-PSK
(240)
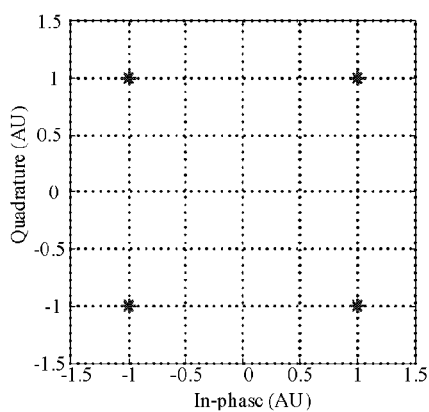
Constellation for 4-QAM
(250)
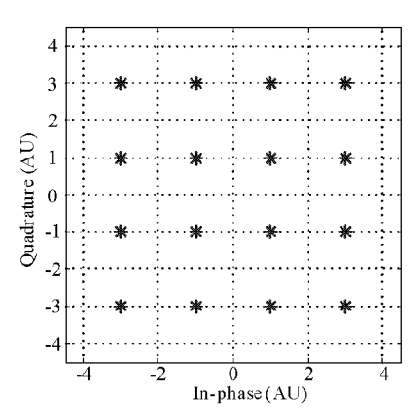
Constellation for 16-QAM
(260)
Fig. 2

(500) A computer program product (502) Signal bearing medium (504) at least one of one or more instructions for receiving, by the second wireless system from the first wireless system, configuration information associated with the plurality of first antennas and a plurality of modulation schemes which the first wireless system is configured to support;

determining, by the second wireless system, a plurality of configurations based on the configuration information, wherein each of the plurality of configurations defines a corresponding subset of first antennas selected from the plurality of first antennas and a corresponding modulation scheme selected from the plurality of modulation schemes; and selecting, by the second wireless system, a first configuration from the plurality of configurations, wherein when operating under the first configuration, the first wireless system is configured to achieve one or more performance criteria.

| (506) A computer readable medium | (508) A recordable medium | (510) A communications medium |

ADAPTIVE MODE-SWITCHING SPATIAL MODULATION FOR MIMO WIRELESS COMMUNICATION SYSTEM

CROSS-REFERENCE TO RELATED APPLICATION

The present application is a U.S. national stage filing under 35 U.S.C. §371 of International Application PCT/CN2012/077104, filed Jun. 18, 2012 and entitled "ADAPTIVE MODE-SWITCHING SPATIAL MODULATION FOR MIMO WIRELESS COMMUNICATION SYSTEM." The International Application, including any appendices or attachments thereof, is hereby incorporated by reference in its entirety.

BACKGROUND

A multiple-input multiple-output (MIMO) scheme may use multiple antennas at both the transmitter and receiver to improve communication performance. The MIMO scheme may achieve high bit rates via spatial multiplexing, and low error rates through spatial diversity. Some conventional MIMO implementations may include the Bell Labs layered space-time (BLAST) scheme, which transmits multiple independent data streams over the antennas to obtain high multiplexing gain, and the space time block codes (STBCs) scheme, which transmits multiple copies of a data stream across a number of antennas and exploits the various received versions of the data to improve the reliability of data-transfer. Thus, a MIMO-implemented system may reduce the bit error probability for the same spectral efficiency, comparing to a single-input single-output (SISO) system.

SUMMARY

In accordance with some embodiments of the present disclosure, a method for communicating between a first wireless system having a plurality of first antennas and a second wireless system having a plurality of second antennas is provided. The method includes receiving, by the second wireless system from the first wireless system, configuration information associated with the plurality of first antennas and a plurality of modulation schemes which the first wireless system is configured to support; determining, by the second wireless system, a plurality of configurations based on the configuration information, wherein each of the plurality of configurations defines a corresponding subset of first antennas selected from the plurality of first antennas and a corresponding modulation scheme selected from the plurality of modulation schemes; and selecting, by the second wireless system, a first configuration from the plurality of configurations, wherein when operating under the first configuration, the first wireless system is configured to achieve one or more performance criteria.

In accordance with other embodiments of the present disclosure, another method for communicating between a first wireless system having a plurality of first antennas and a second wireless system having a plurality of second antennas is provided. The method includes transmitting, by the first wireless system to the second wireless system, configuration information associated with the plurality of first antennas and a plurality of modulation schemes which the first wireless system is configured to support; receiving, by the first wireless system, a first configuration defining a first subset of first antennas and a first modulation scheme, wherein the first configuration is selected from a plurality of configurations based on the configuration information, and each of the plurality of configurations defines a corresponding subset of first antennas selected from the plurality of first antennas and a corresponding modulation scheme selected from the plurality of modulation schemes; and transmitting, by the first wireless system utilizing the first subset of first antennas and operating in the first modulation scheme, wireless signals to the second wireless system utilizing the plurality of second antennas.

In accordance with further embodiments of the present disclosure, a wireless system for communicating with a transmitting device having a plurality of transmit antennas is provided. The wireless system includes a plurality of receive antennas; and a mode-selection unit coupled with the plurality of receive antennas, wherein the mode-selection unit is configured to receive, from the transmitting device, configuration information associated with the plurality of transmit antennas and a plurality of modulation schemes which the transmitting device is configured to support; determine a plurality of configurations based on the configuration information, wherein each of the plurality of configurations defines a corresponding subset of transmit antennas selected from the plurality of transmit antennas and a corresponding modulation scheme selected from the plurality of modulation schemes; and select a first configuration from the plurality of configurations, wherein when operating under the first configuration, the transmitting device is configured to achieve one or more performance criteria.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 shows illustrative embodiments of constellation diagrams for various modulation schemes;

FIG. 5 shows an illustrative embodiment of an example computer program product.

DETAILED DESCRIPTION

Figure 1:
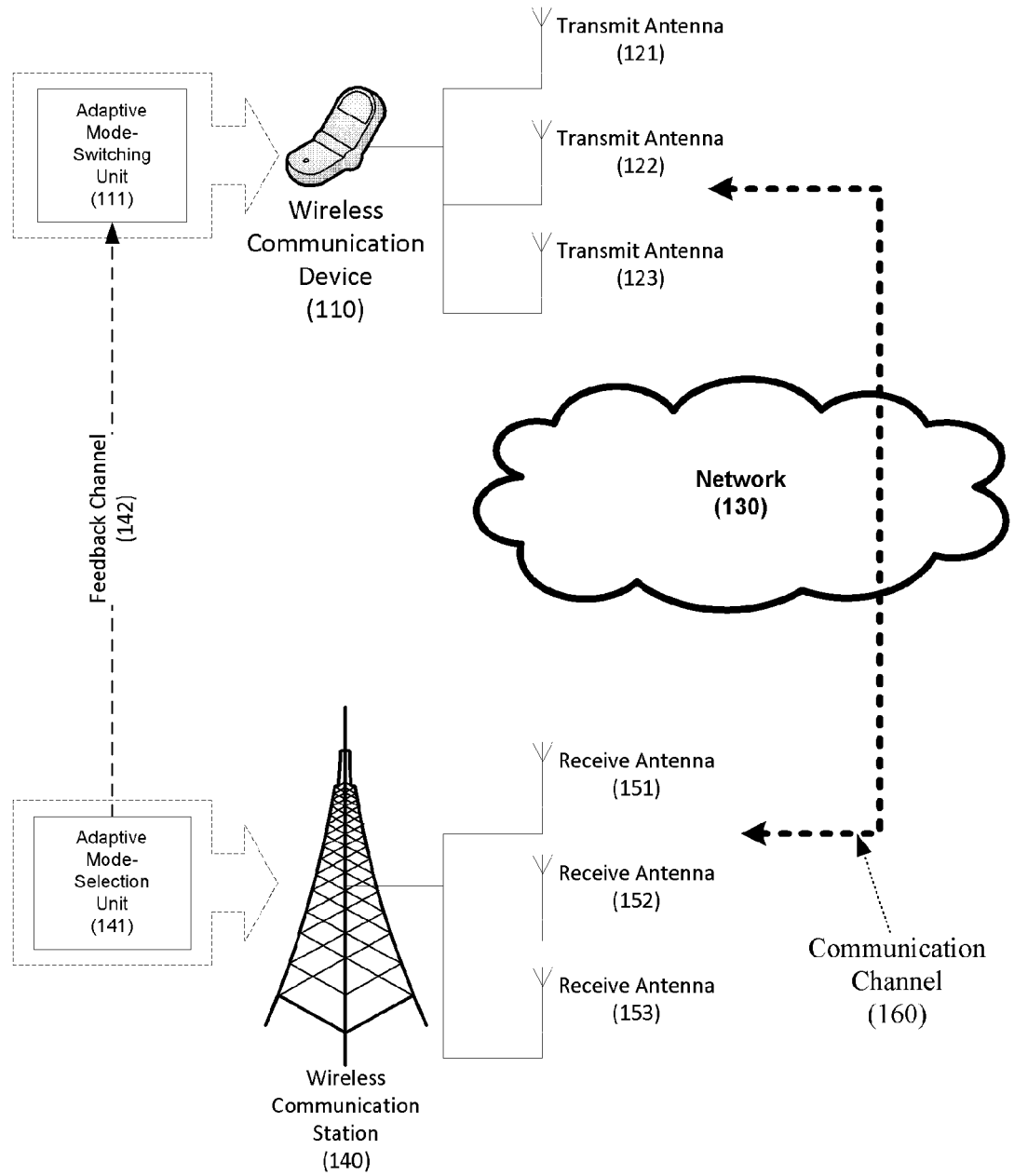
FIG. 1 shows a block diagram illustrating embodiments of a multiple-input multiple-output (MIMO) wireless communication arrangement.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatuses, computer programs, and systems related to an adaptive switching of transmission modes in a MIMO wireless communication.

FIG. 1 shows a block diagram illustrating embodiments of a multiple-input multiple-output (MIMO) wireless communication arrangement. In FIG. 1, a wireless communication device 110 may communicate with a wireless communication station 140 via a network 130. The wireless communication device 110 may be a computing device that can transmit/receive wireless signals using one or more of its transmit antennas 121, 122, and 123. The wireless communication device 110 may be a computer system that includes, without limitation, conventional personal computer (PC), workstation, laptop, tablet PC, handheld computing/communication device, cell phone, smart phone, or a similar device. The wireless communication station 140 may be a base station located at a fixed position, or a computer system that can receive/transmit wireless signals from/to the wireless communication device 110, using one or more of the receive antennas 151, 152, and 153. The network 130 may be, for example, a wireless local area network (WLAN), wide area network (WAN), metropolitan area network (MAN), global area network such as the Internet, a mobile network (e.g., GSM, CDMA, 3G), or any combination of such interconnects.

In some embodiments, during wireless communications, a communication channel 160 may be formed between the transmit antennas 121, 122, and 123, and the receive antennas 151, 152, and 153 for transmitting wireless signals between the wireless communication device 110 and the wireless communication station 140. The communication channel 160 may be a logical connection over a multiplexed medium provided by the network 130. The wireless signals, either digital or analog, may be modulated before transmitting to, and demodulated after received from, the communication channel 160. Further, the communication channel 160 may include multiple links (not shown in FIG. 1) each of which is formed by associating a specific transmit antenna with a corresponding receive antenna. For example, when wireless signals transmitted by the transmit antenna 121 is received by the receive antenna 152, a link is formed between these two antennas.

In some embodiments, the wireless communication device 110 and/or the wireless communication station 140 may support multiple "modulation schemes" for modulating and de-modulating wireless signals. For example, the modulation schemes may include, without limitation, phase-shift keying (PSK), frequency-shift keying (FSK), amplitude-shift keying (ASK), and quadrature amplitude modulation (QAM). The modulation schemes may further include M-PSK and M-QAM, (M being a modulation level equaling $2^i$, i>0), which define modulating and/or demodulating multiple aspects of the amplitude, phase, and/or frequency of the wireless signals.

In some embodiments, the wireless communication device 110 and the wireless communication station 140 may engage MIMO communication utilizing their respective transmit antennas 121, 122, 123, and receive antennas 151, 152, and 153. The terms "transmit antennas" and "receive antennas" are for illustrative purposes, as these antennas are configured to transmit and/or receive wireless signals individually, jointly, separately, sequentially, and/or simultaneously. For illustrative purposes, the wireless communication device 110 may act as a transmitter, and the wireless communication station 140 may act as a receiver, and/or vice versa. In some embodiments, the roles of transmitter and receiver may be reversed for the wireless communication device 110 and the wireless communication station 140.

In some embodiments, the wireless communication device 110 and the wireless communication station 140 may adopt a spatial modulation (SM) technique, which is configured to activate one transmit antenna at a time for transmitting the wireless signals. Such a communication approach may be referred to as SM-MIMO. The SM-MIMO approach may significantly increase the spectral efficiency of the MIMO wireless communication, and reduce the inter-channel interference (ICI) and inter-antenna synchronization (IAS) caused by simultaneous transmission of the wireless signals on the same signal frequency, by multiple transmit antennas. The SM-MIMO approach may be suitable for any number of transmit antennas ($N_t$) and any number of receive antennas ($N_r$), especially for an unbalanced $N_t \times N_r$ MIMO channel 160 in which the number of transmit antennas $N_t$ is much larger than that of the receive antennas $N_r$. Hence, without reducing the achievable spectral efficiency rate, the SM-MIMO approach may yield a better performance than other conventional MIMO communication approaches, such as vertical BLAST (V-BLAST), amplitude phase modulation (APM) with maximum ratio combining (MRC), and STBCs.

In some embodiments, the wireless communication device 110 may be configured to operation in a specific "transmission mode" or "transmit mode" when utilizing a specific number of transmit antennas and operating in a specific modulation scheme. The wireless communication device 110 may change or switch to a different transmission mode based on a specific configuration by either using a different number of transmit antennas or switching to a different modulation scheme.

Thus, a dynamic channel-aware transmit mode selection (TMS) scheme may be developed for achieve an even higher system performance on the basis of the SM-MIMO approach. Comparing to the SM-MIMO approach in which the number of transmit antennas as well as the transmission mode are fixed, the adaptive mode-switching SM MIMO (AMS-SM-MIMO) scheme may allow adjustments to the otherwise inflexible SM configuration and dynamically adopt an optimal transmission mode to the time-varying conditions of the communication channel 160. Thus, the AMS-SM-MIMO scheme provides a useful means to exploit the degrees of spatial freedom offered by the MIMO communication channel 160. The details about the AMS-SM-MIMO scheme are further described below.

In some embodiments, the wireless communication device 110 may contain an adaptive mode-switching unit ("mode-switching unit") 111, and the wireless communication station 140 may contain an adaptive mode-selection unit ("mode-selection unit") 141 for implementing the AMS-SM-MIMO scheme. The mode-switching unit 111 may first transmit a message to the mode-selection unit 141. The message may contain configuration information describing how many transmit antennas 121, 122, and 123 the wireless communication device 110 has, as well as the types of modulation schemes the wireless communication device 110 supports. Further, the wireless communication device 110 and/or the wireless communication station 140 may individually or jointly determine a spectral efficiency rate (a rate of transmitting data over a specific communication channel, measured in (bit/s)/Hz) for transmitting the wireless signals through the communication channel 160.

In some embodiments, the mode-selection unit 141 may determine the current conditions of the communication channel 160, compute an optimal configuration for the wireless communication device 110 based on the channel conditions and the configuration information received from the wireless communication device 110, and transmit the optimal configuration to the mode-switching unit 111 via a low-rate feedback channel 142. The optimal configuration may define a candidate set of transmit antennas and a specific modulation scheme that allow the wireless communication device 110 to achieve a specific spectral efficiency rate. Further, the wireless communication device 110 may achieve a better performance when operating under the optimal configuration than under any other configurations.

In some embodiments, the mode-switching unit 111 may then switch the transmission mode of the wireless communication device 110 based on the optimal configuration. Specifically, the mode-switching unit 111 may activate the candidate set of transmit antennas selected from all transmit antennas, as defined by the optimal configuration, and perform signal transmissions utilizing the specific modulation scheme as defined by the optimal configuration. The above mode-selection process and mode-switching process may be repeated, so that the wireless communication between the wireless communication device 110 and the wireless communication station 140 may always be adapted to the conditions of the communication channel 160. Thus, the AMS-SM-MIMO scheme may provide considerable system performance improvement in uncorrelated and/or correlated channel conditions, as compared to the conventional SM schemes.

FIG. 2 shows illustrative embodiments of constellation diagrams for various modulation schemes. A "constellation diagram" may be a representation of a signal modulated by a modulation scheme such as PSK or QAM. The constellation diagram displays the signal as a two-dimensional scatter diagram in the complex plane at symbol sampling instants. A "constellation point" is a point illustrated on the constellation diagram in accordance with the modulation scheme. For example, if the modulation scheme is a PSK having a modulation level of 2 (e.g., 2-PSK or B-PSK), the constellation points may be [−1+0i] or [1+0i]. If the modulation scheme is a 4-PSK, the constellation points may be [−0.7071−0.7071i], [−0.7071+0.7071i], [0.7071−0.7071i], and [0.7071+0.7071i].

In some embodiments, each transmit antenna may be in a state of non-transmission, or transmitting using M-PSK and/or M-QAM modulation schemes. For M-QAM modulation schemes, there may be square QAM constellations with $M=2^{2i}$, and rectangular QAM constellations with $M=2^{2i+1}$ (i being an integer and $1 \leq i \leq 4$). The rectangular QAM constellations may be implemented using two independent pulse-amplitude modulations: one on the in-phase branch and the other on the quadrature-phase branch. The M-PSK modulation schemes may have modulation levels M=2, 4, 8, 16, 32, 64, 128, and 256, etc.

In some embodiments, the SM-MIMO scheme may modulate wireless signals using an antenna dimension (AD), which is associated with the transmit antennas, and a constellation dimension (CD), which is associated with a modulation scheme. Specifically, a block of data bits to be transmitted by the transmit antennas may be mapped using two information-carriers: a first information-carrier utilizing a symbol selected from a constellation diagram associated with a modulation scheme, and a second information-carrier using a unique transmit-antenna index selected from an array of transmit antenna. Further, the SM scheme may use different combinations of modulation schemes and transmit antenna array to achieve a specific spectral efficiency rate. For example, the SM scheme may choose a modulation scheme that has a constellation size d, and choose a number of transmit antennas K ($K \leq N_{all}$) to achieve a specific spectral efficiency of m bits/s/Hz, where $N_{all}$ is the total number of antennas available at the wireless communication device.

The following Table 1 may show a mapping of input data bits for a SM scheme that utilizes two transmit antennas and 4-PSK modulation scheme. The antenna index may refer to the AD, the PSK symbol may refer to the CD, and the transmitted symbol may refer to the mapping outputs that are associated with the input bits.

TABLE 1

A mapping table for two transmit antennas and 4-PSK

| Input Bits | Antenna index | PSK Symbol | Transmitted symbol |
|---|---|---|---|
| 000 | 1 | +1 | $x_1 = [+1, 0]^T$ |
| 001 | 1 | +i | $x_2 = [+i, 0]^T$ |
| 010 | 1 | −1 | $x_3 = [−1, 0]^T$ |
| 011 | 1 | −i | $x_4 = [−i, 0]^T$ |
| 100 | 2 | +1 | $x_5 = [0, +1]^T$ |
| 101 | 2 | +i | $x_6 = [0, +i]^T$ |
| 110 | 2 | −1 | $x_7 = [0, −1]^T$ |
| 111 | 2 | −i | $x_8 = [0, −i]^T$ |

In some embodiments, a mode-selection unit of a wireless system may first identify the different configurations of modulation schemes and transmit antennas that can achieve the same spectral efficiency rate. As illustrated in FIG. 2, a number of candidate configurations 210, 220 may be identified. For a specific candidate configuration i, $K_i$ may denote to the number of transmit antennas. $H_i$ may represent a selected channel matrix, and $d_i$ may be the modulation level for the transmit antennas used in the candidate configuration i. The number of columns in $H_i$ is equal to the number of transmit antennas $K_i$. Thus, all candidate configurations that may achieve a target spectral efficiency rate m may be given as $$\log_2(d_1 * K_1) = \ldots = \log_2(d_i * K_i) = \ldots = \log_2(d_L * K_L) = m. \quad \text{(Eq. 1)}$$

Let $\mathbb{Q}_m$ be a set of vectors given as $\mathbb{Q}_m = \{q_1, q_2, \ldots, q_i, \ldots, q_L\}$, where $q_i$ is a vector whose elements indicate the combinations of the transmit antennas and modulation levels, and L is a total number of possible transmit candidates for a fixed spectral efficiency m.

For a spectral efficiency rate of 3 bits/s/Hz (i.e. m=3), the mode-selection unit may identify two candidate configurations. The first candidate configuration may have two transmit antennas and a modulation level of 4 ($K_1=2$, $d_1=4$ (i.e., 4-PSK or 4-QAM)). And a second candidate configuration may use 4 transmit antennas and a modulation level of 2 ($K_2=4$ and $d_1=2$ (i.e., B-PSK)). In another example, for a spectral efficiency rate m=4 bits/s/Hz, the candidate configurations may include: 1) $K_1=2$ and $d_1=8$ (i.e., 8-QAM or 8-PSK), and 2) $K_1=4$ and $d_1=4$ (i.e., 4-PSK or 4-QAM).

In some embodiments, the SM scheme may evaluate the different candidate configurations that can achieve a same spectral efficiency rate, and select a best AD and CD mapping configuration for transmitting wireless signals. The different configurations may result in different performance characteristics. As a result, the number of transmit antennas and the size of the signal constellation can be traded off to achieve better performance based on one or more performance criteria, under different channel conditions. For example, a minimum bit error rate (BER) may be one of the performance criteria for selecting a better configuration.

In some embodiments, an optimal configuration may be chosen from the candidate configurations using a Minimum Euclidean Distance (MED) approach. As illustrate in FIG. 2, a candidate configuration may be represented by the channel matrix $H_i$ and the modulation level $d_i$. The channel matrix H may contain elements $h_{vu}$ which are channel state information (CSI) that are estimated using either a maximum-likelihood (ML) or a minimum mean square error (MMSE) criterion. In other words, the mode-selection unit may determine the channel matrix H either using a perfectly estimated CSI, or based on an actual CSI obtained from a communication channel.

Suppose there are L candidate configurations for a fixed spectral efficiency rate, these candidate configurations may be denoted as $\{H_i, d_i\}_{i=1}^{L}$. Thus, the optimal configuration may be determined based on the following equation 2:

$$\hat{C}_{AMS} = \underset{(H_i, d_i) \in Q_m}{\operatorname{argmax}} d_{min}(H_i, d_i), \quad (\text{Eq. 2})$$

where $\hat{C}_{AMS}$ is the index of optimal AMS-SM candidate for transmission, and $d_{min}(H_i, d_i)$ is the MED of the receive constellation as a function of $H_i$ and $d_i$. In other words, all candidate configurations may be stored in an indexed table at the transmitter and/or the receiver. Once an optimal configuration for transmission is selected, the index for the optimal configuration in the indexed table, rather than the optimal configuration, may be feedback to the transmitter.

In some embodiments, a solution for the above-mentioned candidate optimization problem may be solved by using the MED values of the received constellation $d_{min}(H)$ as the means for comparing the performances of different candidate configurations. Specifically, the $d_{min}(H)$ may be solved with a fixed channel $H \in \mathbb{C}^{N_r \times K}$ and a modulation level vector $d = \{d^1, \ldots, d^n, \ldots, d^K\}$, where $d^n$ is the modulation level for n-th transmit antenna ($1 \le n \le K$). Thus, the optimal configuration may be chosen from all possible candidate configurations for having the largest $d_{min}(H)$. Thus, the optimal configuration is the configuration that has the largest MED value among the candidate configurations.

In a SM scheme, since one transmit antenna is active at each time, only one element of x is nonzero. Assume that $x_u = [0, \ldots, a_u^p, \ldots, 0]$ and $x_v = [0, \ldots, b_v^q, 0, \ldots, 0]$ are two different transmit symbols, where $a_u^p$ and $b_v^q$ denote the p and q constellation points transmitted at the u-th and v-th antenna, respectively. Since the value $d_{min}(H)$ is positive, it can be recalculated as $$d_{min}^2(H) = \min_{\substack{a_u^p, b_v^q \in \chi \\ a_u^p \ne b_v^q}} \left\| \begin{pmatrix} a_u^p h_{1,u} \\ a_u^p h_{2,u} \\ \vdots \\ a_u^p h_{N_r,u} \end{pmatrix} - \begin{pmatrix} b_v^q h_{1,v} \\ b_v^q h_{2,v} \\ \vdots \\ b_v^q h_{N_r,v} \end{pmatrix} \right\|_F^2 =$$

$$\min_{\substack{a_u^p, b_v^q \in \chi \\ a_u^p \ne b_v^q}} \{|a_u^p|^2 m_{uu} + |b_v^q|^2 m_{vv} - 2\operatorname{Re}\{a_u^p (b_v^q)^* m_{uv}\}\},$$

where $\chi$ is the set of all possible transmit symbols from signal constellation with modulation level vector d, $h_{uv}$ is the channel gain between transmit antenna v and the receive antenna u, and $(\cdot)^*$ and $(\cdot)^H$ denote conjugate and Hermitian transpose, respectively. For a complex variable x, $\operatorname{Re}\{x\}$ denotes the real part of x. Furthermore, $\|\cdot\|_F$ stands for the Frobenius norm. Moreover, $m_{uv}$ denotes the inner product between the column u and v of the channel matrix, which can be shown to be $$\begin{cases} m_{uu} = |h_{1,u}|^2 + |h_{2,u}|^2 + \ldots + |h_{N_r,u}|^2 \\ m_{vv} = |h_{1,v}|^2 + |h_{2,v}|^2 + \ldots + |h_{N_r,v}|^2 \\ m_{uv} = h_{1,u} h_{1,v}^* + h_{2,u} h_{2,v}^* + \ldots + h_{N_r,u} h_{N_r,v}^* \end{cases}.$$

All the possible inner product values among the columns of the channel matrix may be the elements of matrix $H^H H$. Hence, to alleviate the computation load, a table containing the values of matrix $H^H H$ may be set-up for each channel realization.

The constellation diagrams for 4-PSK 230, 16-PSK 240, 4-QAM 250, and 16-QAM 260 are shown in FIG. 2, and used for the following examples. In a first example, assuming $N_{all} = 4$, $N_r = 2$ and m=3, as mentioned above, the mode-selection unit may determine two candidate configurations: 1) two transmit antennas and 4-PSK, and 2) four transmit antennas and BPSK. The mapping tables of these candidates are depicted in the following Tables 2 and 3.

TABLE 2

A mapping table of candidate 1 (SM with two transmit antennas and 4-PSK)

| Input Bits | Antenna index | PSK Symbol | Transmitted symbol |
| --- | --- | --- | --- |
| 000 | 1 | +1 | $x_1 = [+1, 0]^T$ |
| 001 | 1 | +j | $x_2 = [+j, 0]^T$ |
| 010 | 1 | −1 | $x_3 = [-1, 0]^T$ |
| 011 | 1 | −j | $x_4 = [-j, 0]^T$ |
| 100 | 2 | +1 | $x_5 = [0, +1]^T$ |
| 101 | 2 | +j | $x_6 = [0, +j]^T$ |
| 110 | 2 | −1 | $x_7 = [0, -1]^T$ |
| 111 | 2 | −j | $x_8 = [0, -j]^T$ |

TABLE 3

A mapping table of candidate 2 (SM with four transmit antennas and BPSK)

| Input Bits | Antenna index | PSK Symbol | Transmitted symbol |
| --- | --- | --- | --- |
| 000 | 1 | −1 | $x_1 = [-1, 0, 0, 0]^T$ |
| 001 | 1 | +1 | $x_2 = [+1, 0, 0, 0]^T$ |
| 010 | 2 | −1 | $x_3 = [0, -1, 0, 0]^T$ |
| 011 | 2 | +1 | $x_4 = [0, +1, 0, 0]^T$ |
| 100 | 3 | −1 | $x_5 = [0, 0, -1, 0]$ |
| 101 | 3 | +1 | $x_6 = [0, 0, +1, 0]^T$ |
| 110 | 4 | −1 | $x_7 = [0, 0, 0, -1]^T$ |
| 111 | 4 | +1 | $x_8 = [0, 0, 0, +1]^T$ |

When the input bits are "100", according to Table 2, the third transmit antenna may transmit a 4-PSK symbol "+1", thus the transmitted vector is $x = [0 +1]^T$. In Table 3, "100" may indicate that the third transmit antenna transmitting a BPSK symbol "−1", thus the transmitted vector is $x = [0, 0, -1, 0]^T$.

Based on the following channel matrix and noise vector, $$H = \begin{bmatrix} h_{1,1} & h_{1,2} & h_{1,3} & h_{1,4} \\ h_{2,1} & h_{2,2} & h_{2,3} & h_{2,4} \end{bmatrix} =$$

-continued $$\begin{bmatrix} -0.08+0.34i & 0.99-0.51i & -0.47-0.20i & 0.50-0.62i \\ 1.05+0.73i & 1.00+0.21i & -0.85-0.55i & 1.51-081i \end{bmatrix}$$

$n = [-0.0049+0.0089i \quad 0.0061-0.0113i]^T$

Thus, the values $m_{uu}$, $m_{vv}$, $m_{uv}$ for candidate 1 may be $$H^H H = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} =$$

$$\begin{bmatrix} 1.75 & 0.95-080i & -1.32+0.21i & 0.74-2.07i \\ 0.95+0.80i & 2.28 & -1.32-0.80i & 2.15-1.48i \\ -1.32-0.21i & -1.32+0.80i & 1.28 & -0.94+1.91i \\ 0.74+2.07i & 2.15+1.48i & -0.94-1.91i & 3.57 \end{bmatrix}$$

Specifically, the above elements may be calculated as the following, where $h_i$ is the i-th column of channel matrix H:

$m_{11} = h^*_1 \times h_1 = |h_{1,1}|^2 + |h_{2,1}|^2 = (0.08^2 + 0.34^2) + (1.05^2 + 0.73^2) = 1.75$ $m_{12} = h^*_1 \times h_2 = h^*_{1,1} h_{1,2} + h^*_{2,1} h_{2,2} = (-0.08 - 0.34i) \times (0.99 - 0.51i) + (1.05 - 0.73i) \times (1.00 + 0.21i) = 0.95 - 0.80i$ $m_{13} = h^*_1 \times h_3 = h^*_{1,1} h_{1,3} + h^*_{2,1} h_{2,3} = (-0.08 - 0.34i) \times (-0.47 - 0.20i) + (1.05 - 0.73i) \times (-0.85 - 0.55i) = -1.32 + 0.21i$ $m_{14} = h^*_1 \times h_4 = h^*_{1,1} h_{1,4} + h^*_{2,1} h_{2,4} = (-0.08 - 0.34i) \times (0.50 - 0.62i) + (1.05 - 0.73i) \times (1.51 - 0.81i) = 0.74 - 2.07i$ $m_{21} = h^*_2 \times h_1 = m_{12}^* = 0.95 + 0.80i$ $m_{22} = h^*_2 \times h_2 = |h_{1,2}|^2 + |h_{2,2}|^2 = (0.99^2 + 0.51^2) + (1.00^2 + 0.21^2) = 2.28$ $m_{23} = h^*_2 \times h_3 = h^*_{1,2} h_{1,3} + h^*_{2,2} h_{2,3} = (0.99 - 0.51i) \times (-0.47 - 0.20i) + (1.00 + 0.21i) \times (-0.85 - 0.55i) = -1.32 - 0.80i$ $m_{24} = h^*_2 \times h_4 = h^*_{1,2} h_{1,4} + h^*_{2,2} h_{2,4} = (0.99 - 0.51i) \times (0.50 - 0.62i) + (1.00 + 0.21i) \times (1.51 - 0.81i) = 2.15 - 1.48i$ $m_{31} = h^*_3 \times h_1 = m_{13}^* = -1.32 - 0.21i$ $m_{32} = h^*_3 \times h_2 = m_{23}^* = -1.32 + 0.80i$ $m_{33} = h^*_3 \times h_3 = |h_{1,3}|^2 + |h_{2,3}|^2 = (0.47^2 + 0.20^2) + (0.85^2 + 0.55^2) = 1.28$ $m_{34} = h^*_3 \times h_4 = h^*_{1,3} h_{1,4} + h^*_{2,3} h_{2,4} = (-0.47 - 0.20i) \times (0.50 - 0.62i) + (-0.85 - 0.55i) \times (1.51 - 0.81i) = -0.94 + 1.91i$ $m_{41} = h^*_4 \times h_1 = m_{14}^* = 0.74 + 2.07i$ $m_{42} = h^*_4 \times h_2 = m_{24}^* = 2.15 + 1.48i$ $m_{43} = h^*_4 \times h_3 = m_{34}^* = -0.94 - 1.91i$ $m_{44} = h^*_4 \times h_4 = |h_{1,4}|^2 + |h_{2,4}|^2 = (0.50^2 + 0.62^2) + (1.51^2 + 0.81^2) = 3.57$ Hence, the equation for calculating the MED $$d_{min}^2(H) = \min_{\substack{a_u^p, b_v^q \in \chi \\ a_u^p \neq b_u^q}} \{|a_u^p|^2 m_{uu} + |b_v^q|^2 m_{vv} - 2Re\{a_u^p(b_v^q)^* m_{uv}\}\}$$

where $a_u^p, b_v^q \in \{\pm 1\}$ and $|a_u^p|^2 = |b_v^q|^2 = 1$, may be simplified as $$d_{min}^2(H) = \min_{\substack{a_u^p, b_v^q \in \chi \\ a_u^p \neq b_u^q}} \{m_{uu} + m_{vv} - 2Re\{a_u^p(b_v^q)^* m_{uv}\}\}$$

More specifically,

1) For u=v=1, then $m_{uu}+m_{vv}-2Re\{a_u^p(b_v^q)^* m_{uv}\} = m_{11}+m_{11}-2Re\{a_1^p(b_1^q)^* m_{11}\}$. If $a_1^p=1$, $b_1^q=-1$, $d_1^2 = m_{11}+m_{11}-2Re\{a_1^p(b_1^q)^* m_{11}\} = 2 \times 1.75 - 2 \times Re\{-1.75\} = 7$ and $d_1 = 2.65$ 2) For u=1, v=2, then $m_{uu}+m_{vv}-2Re\{a_u^p(b_v^q)^* m_{uv}\} = m_{11}+m_{22}-2Re\{a_1^p(b_2^q)^* m_{12}\}$. If $a_1^p=1$, $b_2^q=1$, $d_2^2 = m_{11}+m_{22}-2Re\{a_1^p(b_2^q)^* m_{12}\} = 1.75+2.28-2 \times Re\{0.95-0.80i\} = 2.13$ and $d_2=1.43$;

If $a_1^p=1$, $b_2^q=-1$, $d_3^2 = m_{11}+m_{22}-2Re\{a_1^p(b_2^q)^* m_{12}\} = 1.75+2.28-2 \times Re\{-0.95+0.80i\} = 5.93$ and $d_3=2.43$;

If $a_1^p=-1$, $b_2^q=1$, $d_4^2 = m_{11}+m_{22}-2Re\{a_1^p(b_2^q)^* m_{12}\} = 1.75+2.28-2 \times Re\{-0.95+0.80i\} = 5.93$ and $d_4=2.43$;

3) For u=1, v=3, then $m_{uu}+m_{vv}-2Re\{a_u^p(b_v^q)^* m_{uv}\} = m_{11}+m_{33}-2Re\{a_1^p(b_3^q)^* m_{13}\}$. If $a_1^p=1$, $b_3^q=1$, $d_5^2 = m_{11}+m_{33}-2Re\{a_1^p(b_3^q)^* m_{13}\} = 1.75+1.28-2 \times Re\{-1.32+0.21i\} = 5.67$ and $d_5=2.38$;

If $a_1^p=1$, $b_3^q=-1$, $d_6^2 = m_{11}+m_{33}-2Re\{a_1^p(b_3^q)^* m_{13}\} = 1.75+2.28-2 \times Re\{-1.32-0.21i\} = 0.39$ and $d_6=0.62$;

If $a_1^p=-1$, $b_3^q=1$, $d_7^2 = m_{11}+m_{33}-2Re\{a_1^p(b_3^q)^* m_{13}\} = 1.75+2.28-2 \times Re\{-1.32-0.21i\} = 0.39$ and $d_7=0.62$;

4) For u=1, v=4, then $m_{uu}+m_{vv}-2Re\{a_u^p(b_v^q)^* m_{uv}\} = m_{11}+m_{44}-2Re\{a_1^p(b_4^q)^* m_{14}\}$. If $a_1^p=1$, $b_4^q=1$, $d_8^2 = m_{11}+m_{44}-2Re\{a_1^p(b_4^q)^* m_{14}\} = 1.75+3.57-2 \times Re\{0.74-2.07i\} = 3.84$; $d_8=1.95$;

If $a_1^p=1$, $b_4^q=-1$, $d_9^2 = m_{11}+m_{44}-2Re\{a_1^p(b_4^q)^* m_{14}\} = 1.75+3.57-2 \times Re\{-0.74+2.07i\} = 6.8$; $d_9=2.60$;

If $a_1^p=-1$, $b_4^q=1$, $d_{10}^2 = m_{11}+m_{44}-2Re\{a_1^p(b_4^q)^* m_{14}\} = 1.75+3.57-2 \times Re\{-0.74+2.07i\} = 6.8$; $d_{10}=2.60$;

5) For u=2, v=2, then $m_{uu}+m_{vv}-2Re\{a_u^p(b_v^q)^* m_{uv}\} = m_{22}+m_{22}-2Re\{a_2^p(b_2^q)^* m_{22}\}$. If $a_2^p=1$, $b_2^q=-1$, $d_{11}^2 = m_{22}+m_{22}-2Re\{a_2^p(b_2^q)^* m_{22}\} = 2 \times 2.28 - 2 \times Re\{-2.28\} = 9.12$; $d_{11}=3.01$ 6) For u=2, v=3, then $m_{uu}+m_{vv}-2Re\{a_u^p(b_v^q)^* m_{uv}\} = m_{22}+m_{33}-2Re\{a_2^p(b_3^q)^* m_{23}\}$. If $a_2^p=1$, $b_3^q=1$, $d_{12}^2 = m_{22}+m_{33}-2Re\{a_2^p(b_3^q)^* m_{23}\} = 2.28+1.28-2 \times Re\{-1.32-0.80i\} = 6.20$; $d_{12}=2.49$;

If $a_2^p=1$, $b_3^q=-1$, $d_{13}^2 = m_{22}+m_{33}-2Re\{a_2^p(b_3^q)^* m_{23}\} = 2.28+1.28-2 \times Re\{1.32+0.80i\} = 0.92$ and $d_{13}=0.95$;

If $a_2^p=-1$, $b_3^q=1$, $d_{14}^2 = m_{22}+m_{33}-2Re\{a_2^p(b_3^q)^* m_{23}\} = 2.28+1.28-2 \times Re\{1.32+0.80i\} = 0.92$ and $d_{14}=0.95$;

6) For u=2, v=4, then $m_{uu}+m_{vv}-2Re\{a_u^p(b_v^q)^* m_{uv}\} = m_{22}+m_{44}-2Re\{a_2^p(b_4^q)^* m_{24}\}$. If $a_2^p=1$, $b_4^q=1$, $d_{15}^2 = m_{22}+m_{44}-2Re\{a_2^p(b_4^q)^* m_{24}\} = 2.28+3.57-2 \times Re\{-2.15-1.48i\} = 1.55$ and $d_{15}=1.24$;

If $a_2^p=1$, $b_4^q=-1$, $d_{16}^2 = m_{22}+m_{44}-2Re\{a_2^p(b_4^q)^* m_{24}\} = 2.28+3.57-2 \times Re\{-2.15+1.48i\} = 10.15$ and $d_{16}=3.18$;

If $a_2^p=-1$, $b_4^q=1$, $d_{17}^2 = m_{22}+m_{44}-2Re\{a_2^p(b_4^q)^* m_{24}\} = 2.28+3.57-2 \times Re\{-2.15+1.48i\} = 10.15$ and $d_{17}=3.18$;

7) For u=3, v=3, then $m_{uu}+m_{vv}-2\text{Re}\{a_u^p(b_v^q)^*m_{uv}\}=m_{33}+m_{33}-2\text{Re}\{a_3^p(b_3^q)^*m_{33}\}$. If $a_3^p=1$, $b_3^q=-1$,
$d_{18}^2=m_{33}+m_{33}-2\text{Re}\{a_3^p(b_3^q)^*m_{33}\}=2\times1.28-2\times\text{Re}\{-1.28\}=5.12$ and $d_{18}=2.26$ 8) For u=3, v=4, then $m_{uu}+m_{vv}-2\text{Re}\{a_u^p(b_v^q)^*m_{uv}\}=m_{33}+m_{44}-2\text{Re}\{a_3^p(b_4^q)^*m_{34}\}$. If $a_3^p=1$, $b_4^q=1$, $d_{19}^2=m_{33}+m_{44}-2\text{Re}\{a_3^p(b_4^q)^*m_{34}\}=1.28+3.57-2\times\text{Re}\{-0.94+1.91i\}=6.73$ and $d_{19}=2.59$;
If $a_3^p=1$, $b_4^q=-1$, $d_{20}^2=m_{33}+m_{44}-2\text{Re}\{a_3^p(b_4^q)^*m_{34}\}=1.28+3.57-2\times\text{Re}\{0.94-1.91i\}=2.97$ and $d_{20}=1.72$;
If $a_3^p=-1$, $b_4^q=1$, $d_{21}^2=m_{33}+m_{44}-2\text{Re}\{a_3^p(b_4^q)^*m_{34}\}=1.28+3.57-2\times\text{Re}\{0.94-1.91i\}=2.97$ and $d_{21}=1.72$;

9) For u=4, v=4, then $m_{uu}+m_{vv}-2\text{Re}\{a_u^p(b_v^q)^*m_{uv}\}=m_{44}+m_{44}-2\text{Re}\{a_4^p(b_4^q)^*m_{44}\}$. If $a_4^p=1$, $b_4^q=-1$, $d_{22}^2=m_{44}+m_{44}-2\text{Re}\{a_4^p(b_4^q)^*m_{44}\}=2\times3.57-2\times\text{Re}\{-3.57\}=14.28$ and $d_{22}=3.77$ Based on the above calculations, the calculated Euclidean distances can be represented as $$d_1 = [d_1,d_2,d_3,d_4,d_5,d_6,d_7,d_8,d_9,d_{10},d_{11},d_{12},d_{13},d_{14},d_{15},\ldots$$
$$d_{16},d_{17},d_{18},d_{19},d_{20},d_{21},d_{22}]$$
$$= [2.65, 1.43, 2.43, 2.43, 2.38, 0.62, 0.62, 1.95, 2.6, 2.6, 3.01,$$
$$2.49, 0.95, 0.95, 1.24, \ldots$$
$$3.18, 3.18, 2.26, 2.59, 1.72, 1.72, 3.77]$$

The MED value of the received constellation $d_{min}(H)$ for candidate 1 may be the smallest one of the above values, Thus, the MED value is $d_{min}(H)=0.62$.

For the candidate configuration 2, the first and second columns of channel matrix H may be used. Thus, the channel matrix is $$H_2 = \begin{bmatrix} h_{1,1} & h_{1,2} \\ h_{2,1} & h_{2,2} \end{bmatrix} = \begin{bmatrix} -0.08+.034i & 0.99-0.51i \\ 1.05+0.73i & 1.00+0.21i \end{bmatrix}$$

Using the similar calculations as described above, the calculated Euclidean distances can be represented as $$d_2 = [d_1,d_2,d_3,d_4,d_5,d_6,d_7,d_8,d_9,d_{10},d_{11},d_{12},d_{13},d_{14},\ldots$$
$$d_{15},d_{16},d_{17},d_{18},d_{19},d_{20},d_{21},d_{22},d_{23},d_{24},d_{25},d_{26},d_{27},d_{28}]$$
$$= [1.87, 2.65, 1.87, 2.56, 1.87, 1.87, 1.45, 2.43, 2.37, 1.55,$$
$$2.43, 1.45, 1.55, 1.55, \ldots$$
$$1.55, 1.55, 1.45, 2.43, 1.55, 1.55, 2.43, 1.45, 2.13, 3.09, 2.13,$$
$$3.09, 2.13, 2.13]$$

As a result, the MED value of the received constellation $d_{min}(H)$ for candidate 2 is $d_{min}(H)=1.45$. In this case, the optimal candidate configuration may be candidate 2, for it has the maximal MED value.

Figure 3:
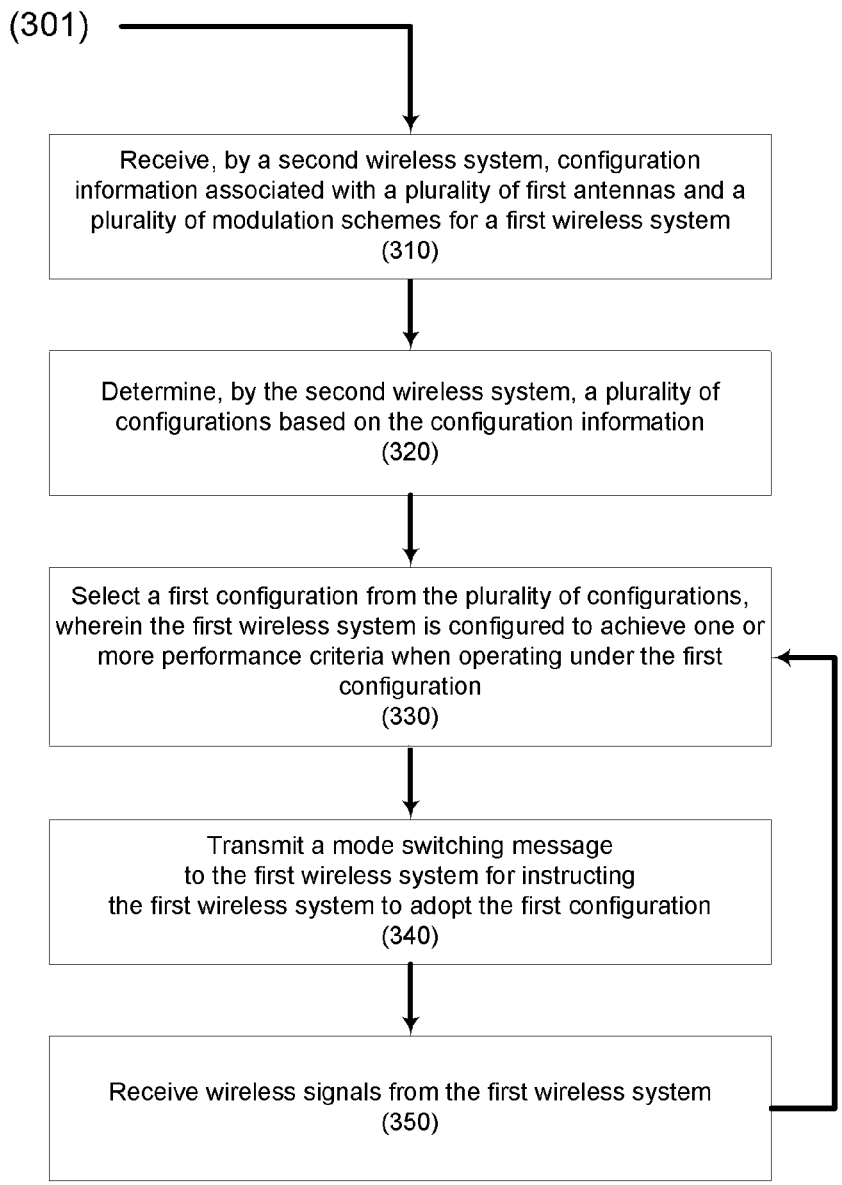
FIG. 3 shows a flow diagram of an illustrative embodiment of a process for implementing a mode-selection.

FIG. 3 shows a flow diagram of an illustrative embodiment of a process 301 for mode-selection. The process 301 may include one or more operations, functions, or actions as illustrated by blocks 310, 320, 330, 340, and 350, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order.

Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 301 may be stored in memory, executed by a processor, and/or implemented in a wireless system.

At block 310, a first wireless system (e.g., a transmitter) may have a plurality of first antennas (transmit antennas) for communicating with a second wireless system (e.g., a receiver), which has one or more second antennas (receive antennas). The second wireless system may receive from the first wireless system, configuration information that may be associated with the plurality of first antennas. Further, the configuration information may be associated with a plurality of modulation schemes which the first wireless system is configured to support. For example, the configuration information may indicate that the first wireless system has 4 transmit antennas, and support modulation schemes such as PSK, QAM, M-PSK, and M-QAM.

At block 320, the second wireless system may determine a plurality of configurations based on the configuration information. Each of the plurality of configurations defines a corresponding subset of first antennas selected from the plurality of first antennas and a corresponding modulation scheme selected from the plurality of modulation schemes. Further, the plurality of configurations may be used to change the transmission modes of the first wireless system. In some embodiments, when operating under any of the plurality of configurations, the first wireless system is configured to transmit signals at a predetermined spectral efficiency rate. In other words, the first wireless system may be adjusted by each one of the plurality of configurations to achieve the same predetermined spectral efficiency rate.

At block 330, a mode-selection unit of the second wireless system may select a first configuration from the plurality of configurations. In some embodiments, the first configuration may be an optimal configuration. When operating under the optimal configuration, the first wireless system is configured to achieve one or more performance criteria. For example, one of the performance criteria may include a bit error rate (BER). Thus, comparing to any other one of the plurality of configurations, the first configuration may allow the first wireless system to perform wireless signal transmissions that has the best BER.

In some embodiments, the mode-selection unit may select the first configuration by first determining a channel matrix which contains channel state information (CSI) for a plurality of links. Each of the links may connect one of the plurality of first antennas with one of the plurality of second antennas. The CSI for each of the links may be estimated as described above. Further, noise factors may also be determined and taken into consideration. Secondly, the mode-selection unit may calculate a corresponding Minimum Euclidean Distance (MED) value for each of the plurality of configurations using the channel matrix. Afterward, the mode-selection unit may select the first configuration from the plurality of configurations for having a largest MED value among the plurality of configurations.

In some embodiments, the mode-selection unit may calculate a corresponding MED value for each of the plurality of configurations. For a configuration that is selected from the plurality of configurations and defines a second subset of first antennas and a second modulation scheme, the mode-selection unit may calculate Euclidean distance values for constellation points that have antenna dimensions associated with the second subset of first antennas and constellation dimensions associated with the second modulation scheme. The mode-selection unit may then select a minimum value from these Euclidean distance values as the corresponding MED value for the configuration.

At block 340, the second wireless system may transmit a mode switching message to the first wireless system for instructing the first wireless system to adopt the first configuration, utilize the first subset of first antennas and operate in the first modulation scheme. The mode switching message may indicate an index of the first configuration in a configuration table maintained by the first wireless system.

At block 350, the second wireless system may receive wireless signals from the first wireless system via the plurality of second antennas. The first wireless system may be operating in the first modulation scheme, and may transmit the wireless signals via the first subset of first antennas. In some embodiments, the first wireless system may utilize spatial modulation (SM) to transmit the wireless signals among the first subset of first antennas and the plurality of second antennas.

In some embodiments, the process 301 may proceed from block 350 to block 330 to repeat the above process. Specifically, the mode-selection unit may select another configuration for the first wireless system, in view of the changes of CSI and noises in the communication channel. The first wireless system may switch its operation from a first transmission mode based on the first configuration to a second transmission mode based on the second configuration.

Figure 4:
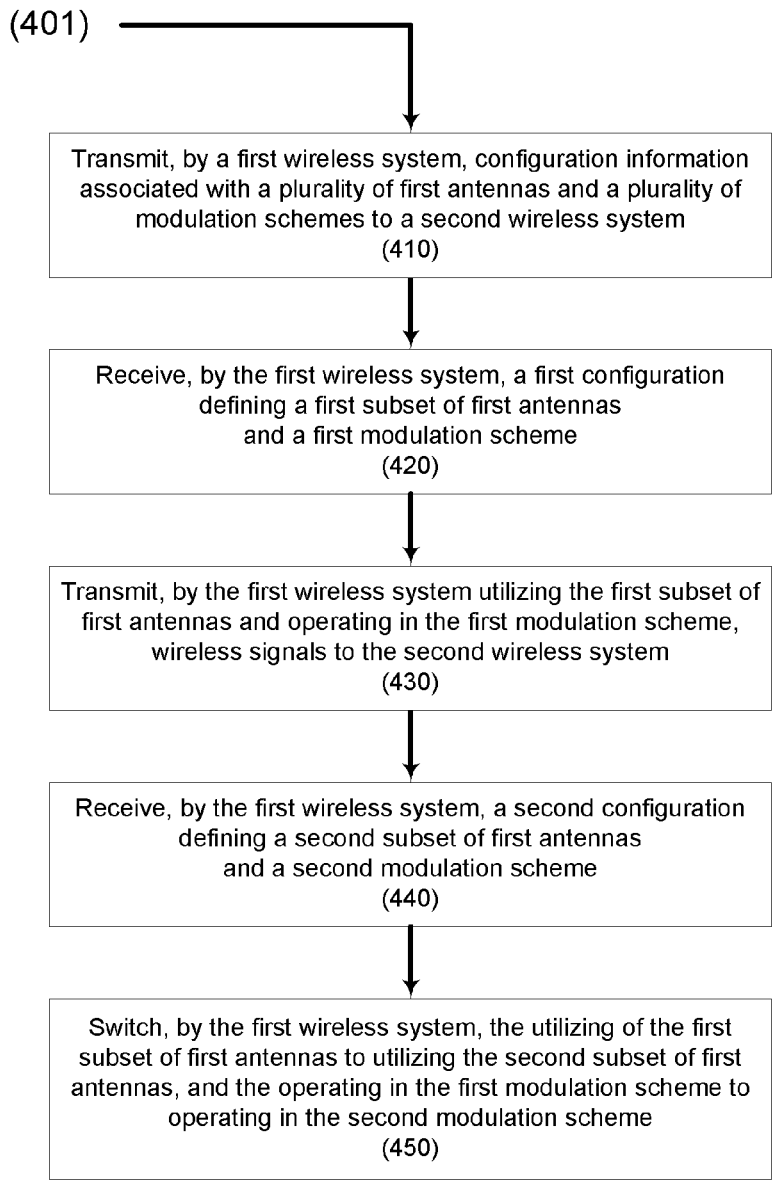
FIG. 4 shows a flow diagram of an illustrative embodiment of a process for implementing a mode-switching.

FIG. 4 shows a flow diagram of an illustrative embodiment of a process for implementing a mode-switching. The process 401 may include one or more operations, functions, or actions as illustrated by blocks 410, 420, 430, 440, and 450, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order.

At block 410, a first wireless system having a plurality of first antennas, may transmit configuration information to a second wireless system having a plurality of second antennas. The configuration information may be associated with the plurality of first antennas and a plurality of modulation schemes which the first wireless system is configured to support.

At block 420, the first wireless system may receive a first configuration defining a first subset of first antennas and a first modulation scheme. In some embodiments, a mode-selection unit of the second wireless system may select the first configuration from a plurality of configurations based on the configuration information. Further, each of the plurality of configurations defines a corresponding subset of first antennas selected from the plurality of first antennas and a corresponding modulation scheme selected from the plurality of modulation schemes. In some embodiments, when operating under any of the plurality of configurations, the first wireless system is configured to transmit signals at a same predetermined spectral efficiency rate.

In some embodiments, the second wireless system may select the first configuration from the plurality of configurations based on a first condition of a communication channel existed between the first wireless system and the second wireless system, and the first wireless system is configured to achieve one or more performance criteria when operating under the first configuration. Specifically, the first condition of a communication channel may be described in a CSI matrix. Further the one or more performance criteria may include BER.

At block 430, the first wireless system may utilize the first subset of first antennas and operate in the first modulation scheme, and transmit wireless signals to the second wireless system which is utilizing the plurality of second antennas. Further, the first wireless system may utilize spatial modulation (SM) to transmit/receive the wireless signals among the first subset of first antennas and the plurality of second antennas.

At block 440, the first wireless system may receive a second configuration from the second wireless system. The second configuration may define a second subset of first antennas selected from the plurality of first antennas and a second modulation scheme selected from the plurality of modulation schemes. In some embodiments, the second configuration is selected from the plurality of configurations based on a second condition of the communication channel, and the first wireless system is configured to achieve the one or more performance criteria when operating under the second configuration. Specifically, the second condition of a communication channel may be described in another CSI matrix.

At block 450, a mode-switching unit of the first wireless system may switch the utilizing of the first subset of first antennas to utilizing the second subset of first antennas, and the operating in the first modulation scheme to operating in the second modulation scheme. In other words, the first wireless system is switched from a transmission mode associated with the first configuration to a different transmission mode associated with the second configuration.

FIG. 5 is a block diagram of an illustrative embodiment of a computer program product 500 for implementing a method for tag refinement strategies. Computer program product 500 may include a signal bearing medium 502. Signal bearing medium 502 may include one or more sets of executable instructions 504 that, when executed by, for example, a processor, may provide the functionality described above. Thus, for example, referring to FIG. 1, the wireless communication device and/or the wireless communication station may undertake one or more of the operations shown in at least FIG. 4 in response to the instructions 504.

In some implementations, signal bearing medium 502 may encompass a non-transitory computer readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to FIG. 1, computer program product 500 may be wirelessly conveyed to the computer system 110 by signal bearing medium 502, where signal bearing medium 502 is conveyed by communications medium 510 (e.g., a wireless communications medium conforming with the IEEE 802.11 standard). Computer program product 500 may be recorded on non-transitory computer readable medium 506 or another similar recordable medium 508.

Figure 6:
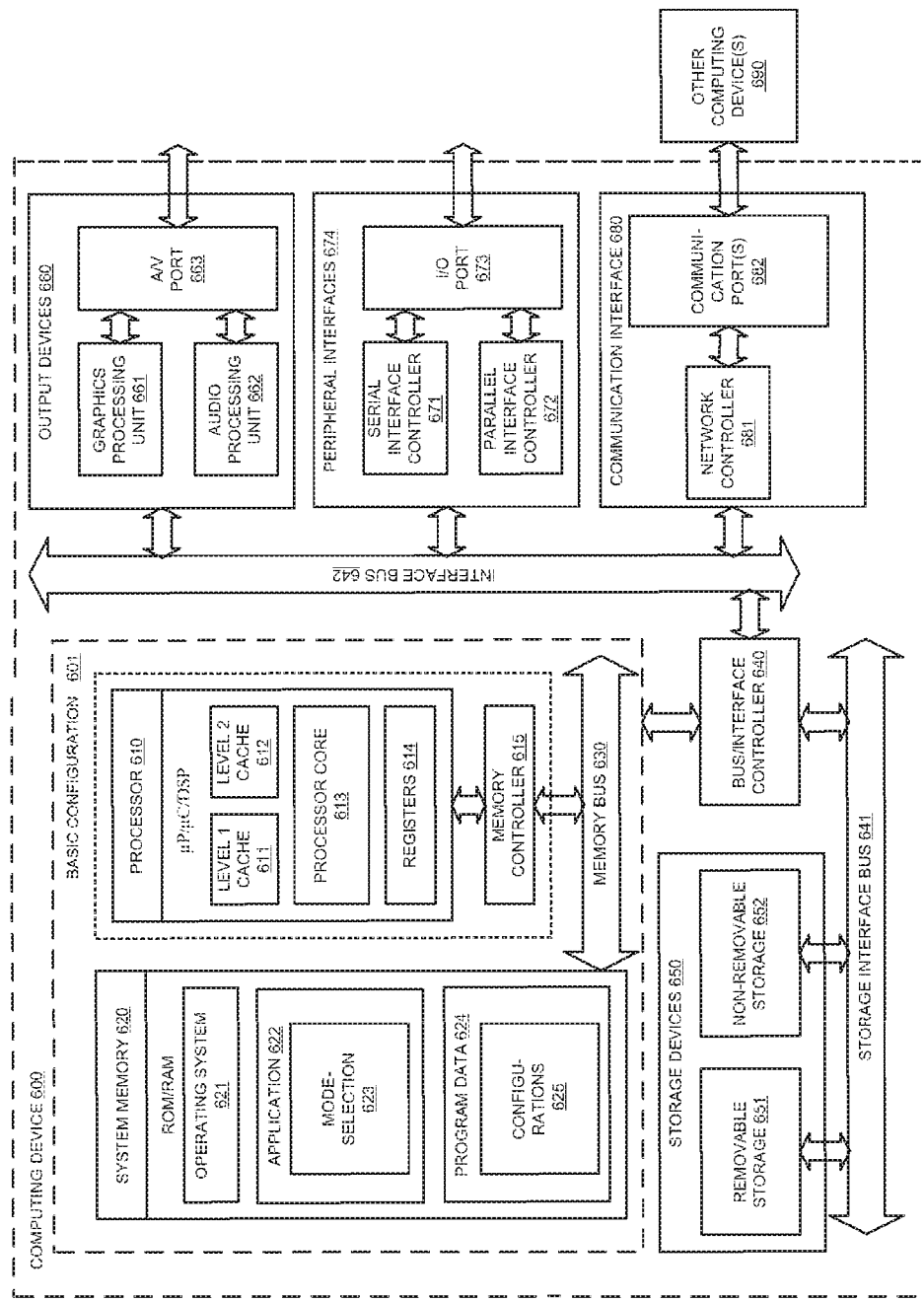
FIG. 6 shows a block diagram of an illustrative embodiment of an example computing device, all arranged in accordance to at least some embodiments of the present disclosure.

FIG. 6 shows a block diagram of an illustrative embodiment of an example computing device system 600. In a very basic configuration 601, the computing device 600 may include one or more processors 610 and a system memory 620. A memory bus 630 may be used for communicating between the processor 610 and the system memory 620.

Depending on the desired configuration, processor 610 may be of any type including but not limited to a microprocessor (μP), a microcontroller (μC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. The system memory 620 may include an operating system 621, one or more applications 622, and program data 624. The application 622 may include a mode-selection 623 that is arranged to perform the functions and/or operations as described herein including at least the functional blocks and/or operations described with respect to the process 401 of FIG. 4. The program data 624 may include configurations 625 to be accessed by the mode-selection 623. In some example embodiments, the application 622 may be arranged to operate with the program data 624 on the operating system 621 such that implementations of the wireless communications may be provided as described herein. This described basic configuration is illustrated in FIG. 6 by those components within dashed line 601.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to communicate between a mobile device having a plurality of transmit antennas and a base station having a plurality of receive antennas, comprising:
   receiving, by the base station from the mobile device, a message comprising configuration information associated with the plurality of transmit antennas and a plurality of modulation schemes which the mobile device is configured to support, wherein the message is received through a first channel between the base station and the mobile device;
   determining, by the base station, a condition of the first channel;
   retrieving, by the base station, a plurality of configurations based on the determined condition of the first channel and the configuration information, wherein each of the plurality of configurations defines a corresponding subset of transmit antennas selected from the plurality of transmit antennas and a corresponding modulation scheme selected from the plurality of modulation schemes;
   determining, by the base station, a channel matrix which contains channel state information for a plurality of links, each of which connects one of the plurality of transmit antennas with one of the plurality of receive antennas;
   calculating, by the base station, a corresponding set of Euclidean distance values for each of the plurality of configurations based on the channel matrix;
   determining, by the base station, a corresponding Minimum Euclidean Distance (MED) value for each of the plurality of configurations based on the corresponding set of Euclidean distance values;
   selecting, by the base station, a first configuration from the plurality of configurations for corresponding to a largest MED value among the determined MED values, wherein when operating under the first configuration, the mobile device is configured to achieve one or more performance criteria; and
   transmitting, by the base station, the first configuration to the mobile device.

2. The method as recited in claim 1, further comprising:
   receiving, by the base station, wireless signals through the first channel from the mobile device which is operating in a first modulation scheme and utilizing a first subset of transmit antennas, wherein the first configuration defines the first subset of transmit antennas and the first modulation scheme.

3. The method as recited in claim 2, wherein the receiving the wireless signals from the mobile device comprises:
   utilizing spatial modulation (SM) to transmit/receive the wireless signals among the first subset of transmit antennas and the plurality of receive antennas.

4. The method as recited in claim 2, further comprising:
   transmitting, by the base station, a mode switching message to the mobile device for instructing the mobile device to utilize the first subset of transmit antennas and operate in the first modulation scheme.

5. The method as recited in claim 1, wherein the plurality of modulation schemes include Phase Shift Keying (PSK) modulation and Quadrature Amplitude Modulation (QAM).

6. The method as recited in claim 1, wherein the one or more performance criteria include a bit error rate (BER).

7. The method as recited in claim 1, wherein when operating under any of the plurality of configurations, the mobile device is configured to transmit signals at a predetermined spectral efficiency rate.

8. The method as recited in claim 1, wherein the corresponding Euclidean distance values are for constellation points having antenna dimensions associated with the corresponding subset of transmit antennas and constellation dimensions associated with the corresponding modulation scheme.

9. A method to communicate between a mobile device having a plurality of transmit antennas and a base station having a plurality of receive antennas, comprising:
    transmitting, by the mobile device, a message comprising configuration information associated with the plurality of transmit antennas and a plurality of modulation schemes which the mobile device is configured to support, wherein the message is transmitted through a first channel between the base station and the mobile device;
    receiving, by the mobile device, a first configuration selected by the base station and defining a first subset of transmit antennas and a first modulation scheme, wherein the first configuration is selected from a plurality of configurations based on the configuration information and a largest Minimum Euclidean Distance (MED) value among MED values corresponding to the plurality of configurations, and each of the plurality of configurations defines a corresponding subset of transmit antennas selected from the plurality of transmit antennas and a corresponding modulation scheme selected from the plurality of modulation schemes; and
    transmitting, by the mobile device utilizing the first subset of transmit antennas and operating in the first modulation scheme, wireless signals to the base station utilizing the plurality of receiver antennas through the first channel.

10. The method as recited in claim 9, wherein the first configuration is selected from the plurality of configurations based on a first condition of the first channel, and the mobile device is configured to achieve one or more performance criteria when operating under the first configuration.

11. The method as recited in claim 10, further comprises:
    receiving, by the mobile device, a second configuration defining a second subset of transmit antennas selected from the plurality of transmit antennas and a second modulation scheme selected from the plurality of modulation schemes; and
    switching, by the mobile device, the utilizing the first subset of transmit antennas to utilizing the second subset of transmit antennas, and the operating in the first modulation scheme to operating in the second modulation scheme.

12. The method as recited in claim 11, wherein the second configuration is selected from the plurality of configurations based on a second condition of the first channel, and the mobile device is configured to achieve the one or more performance criteria when operating under the second configuration.

13. The method as recited in claim 11, wherein the transmitting the wireless signals to the base station comprises:
    utilizing spatial modulation (SM) to transmit/receive the wireless signals among the first subset of transmit antennas and the plurality of receive antennas.

14. The method as recited in claim 9, wherein when operating under any of the plurality of configurations, the mobile device is configured to transmit signals at a predetermined spectral efficiency rate.

15. A base station to communicate with a mobile device having a plurality of transmit antennas, comprising:
    a plurality of receive antennas; and
    a mode-selection unit coupled with the plurality of receive antennas, wherein the mode-selection unit is configured to
    receive, from the mobile device, a message comprising configuration information associated with the plurality of transmit antennas and a plurality of modulation schemes which the mobile device is configured to support, wherein the message is received through a first channel between the base station and the mobile device;
    determine a condition of the first channel;
    retrieve a plurality of configurations based on the determined condition of the first channel and the configuration information, wherein each of the plurality of configurations defines a corresponding subset of transmit antennas selected from the plurality of transmit antennas and a corresponding modulation scheme selected from the plurality of modulation schemes;
    determine a channel matrix which contains channel state information for a plurality of links, each of which connects one of the plurality of transmit antennas with one of the plurality of receive antennas;
    calculate a corresponding set of Euclidean distance values for each of the plurality of configurations based on the channel matrix;
    determine a corresponding Minimum Euclidean Distance (MED) value for each of the plurality of configurations based on the corresponding set of Euclidean distance values;
    select a first configuration from the plurality of configurations for corresponding to a largest MED value among the determined MED values, wherein when operating under the first configuration, the mobile device is configured to achieve one or more performance criteria; and
    transmit the first configuration to the mobile device.

16. The base station of claim 15, wherein the mode-selection unit is further configured to communicate with a mode-switching unit of the mobile device, which configures the mobile device to utilize a first subset of transmit antennas and operate in a first modulation scheme, the first subset of transmit antennas and the first modulation scheme being defined by the first configuration.

17. The base station of claim 16, wherein the mode-selection unit is further configured to utilize spatial modulation (SM) to transmit signals among the first subset of transmit antennas and the plurality of receive antennas.

18. The base station of claim 15, wherein the corresponding Euclidean distance values for constellation points having antenna dimensions associated with the corresponding subset of transmit antennas and constellation dimensions associated with the corresponding modulation scheme.

19. The method of claim 1, wherein the first configuration is transmitted by the base station to the mobile device through a second channel, which is different from the first channel.

* * * * *